United States Patent [19]
Bellantoni, deceased et al.

[11] 3,867,942
[45] Feb. 25, 1975

[54] MOTOR-OPERATED MULTIPLE HAIR TRANSPLANT CUTTER TOOL

[75] Inventors: Frank A. Bellantoni, deceased, late of Yonkers, N.Y. by Clare Bellantoni, administratrix; John Walter Tucciarone, Harrison, N.Y.

[73] Assignees: Taman M. Aseff, Jr., New York; John Walter Tucciarone, Harrison, both of, N.Y. ; part interest to each

[22] Filed: June 8, 1972

[21] Appl. No.: 260,853

[52] U.S. Cl. .................. 128/305, 173/50, 175/108, 408/42, 408/53, 408/129
[51] Int. Cl... A61b 17/32, B23b 45/02, B23b 47/00
[58] Field of Search ......... 128/305; 172/22; 173/50; 175/108; 408/42, 53, 126, 129

[56] References Cited
UNITED STATES PATENTS

| | | | |
|---|---|---|---|
| 1,856,065 | 5/1932 | Austin | 173/50 X |
| 3,314,146 | 4/1967 | Cooksey | 128/305 X |
| 3,522,809 | 8/1970 | Cornell | 128/305 |
| 3,561,449 | 2/1971 | Bellantoni | 128/305 |

FOREIGN PATENTS OR APPLICATIONS

| | | | |
|---|---|---|---|
| 675,747 | 7/1952 | Great Britain | 173/50 |
| 1,267,784 | 5/1968 | Germany | 128/305 |

*Primary Examiner*—Channing L. Pace

[57] ABSTRACT

A power operated hair transplant cutting tool for use in removing multiple patches of skin with hair from the hair area of a scalp for insertion into openings formed by the same tool on the bald area of the head, the patches without the hair being removed to allow for the replacement in the openings of the hair patches taken from the hair area of the scalp. This tool has multiple cutter tool elements, each of which having a sharp circular cutting edge provided upon the end of its sleeve formation and extending upwardly into the cutter tool head are shanks having respectively gears connected together as a train for rotation in unison. A handle extends outwardly from the cutter tool head and has an electric motor therein with a shaft that extends into the cutting tool head. This shaft has a driving worm and in mesh therewith is a worm wheel that is carried on a shaft that extends vertically tool head and which further has a wheel gear that meshes with one of the gears on one of the shanks and one of the gears of the train of gears so that all of the cutter tool element shanks will be rotated in unison, certain of the shanks being rotated in one direction while other shanks are rotated in the opposite direction. These cutting tool shanks are arranged in two rows of three shanks each, one row is in the front of the cutter tool head while the other row is in the rear thereof with the individual cutter tool element shanks being respectively staggered with corresponding shanks in the front row, all of the shanks of one row will be operated in one direction while the shanks of the other row are rotated in the opposite direction. In one form of the invention the individual cutter tool element shanks can be adjusted between extended and retracted positions and are grooved at the upper ends of the shanks and latch members carried on the tool head have grooves to hold the individual shank in either of its adjusted positions. In the other form of the invention an adjusting mechanism is provided for adjusting all of the cutter tool element shanks in unison so that the cutting edges can conform to an arc shaped to apply equal cutting pressure and depth upon the curved scalp. This mechanism has a bendable plate to which the upper end of the shanks are rotatably connected and an adjusting mechanism for bending the plate intermediate its length to arc the same. A power cable extends from the handle to a foot switch that in turn may be connected to a wall receptacle.

9 Claims, 15 Drawing Figures

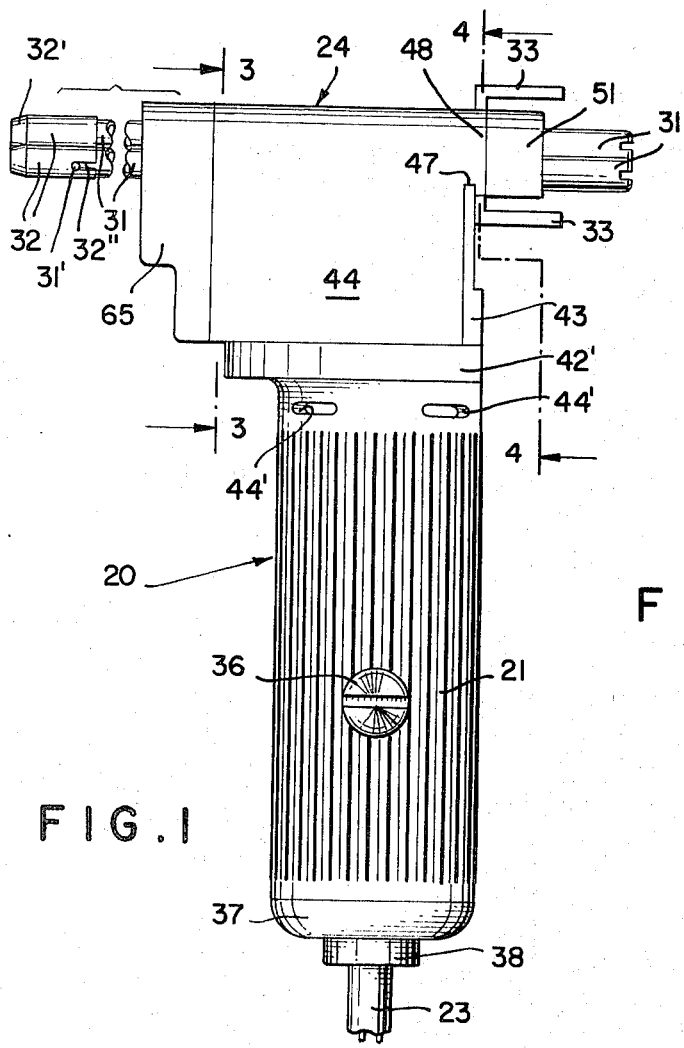
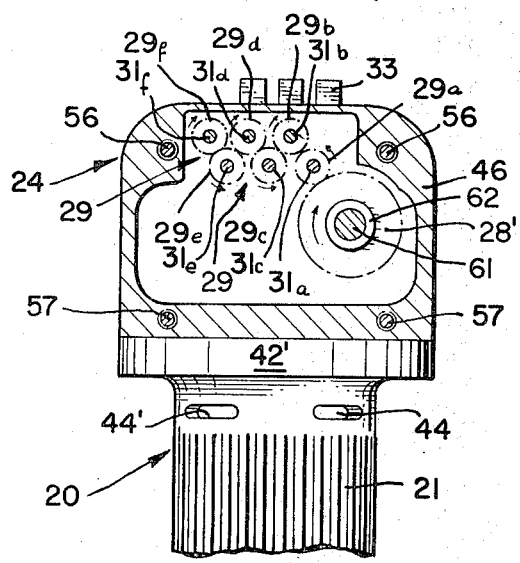
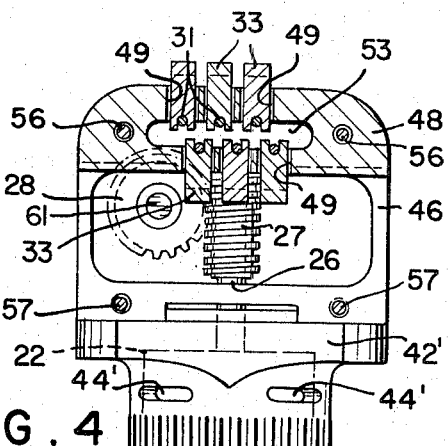

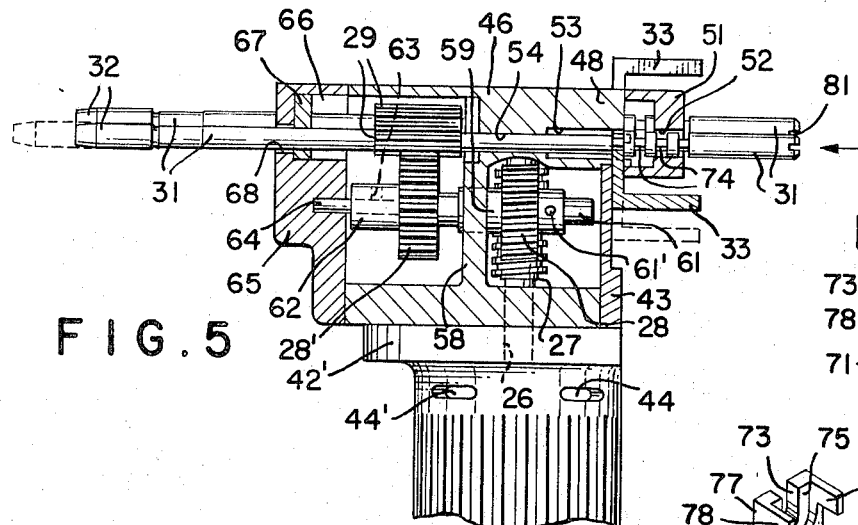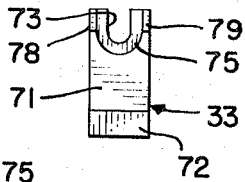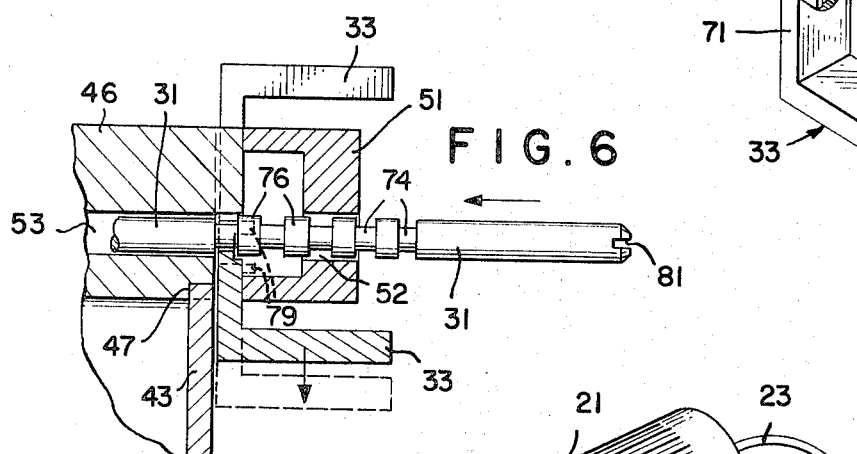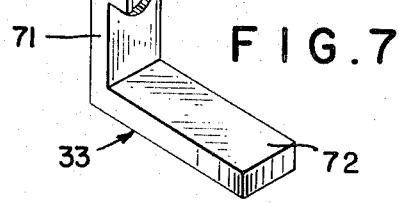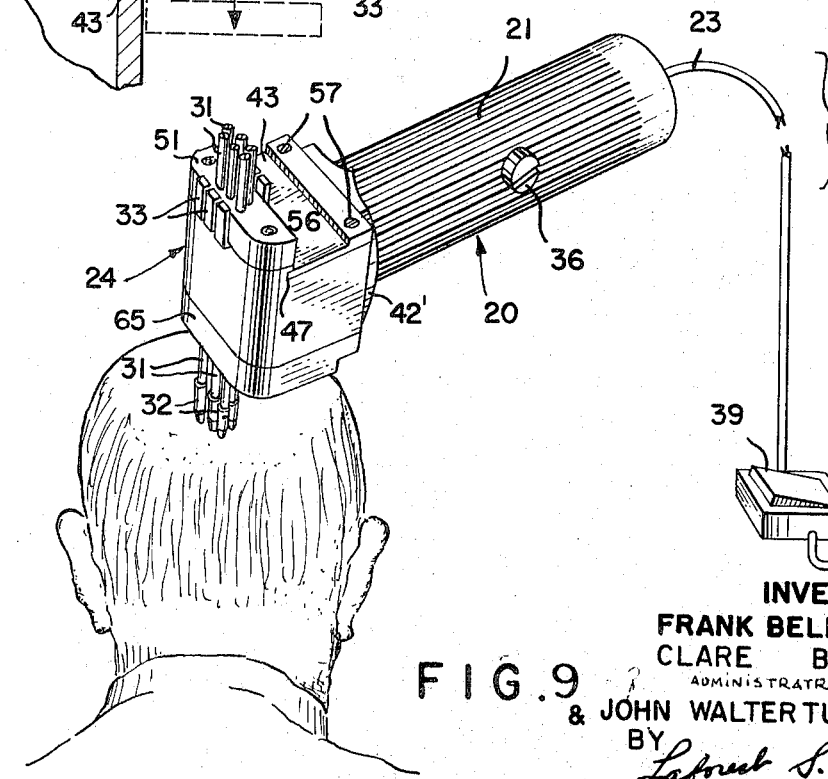

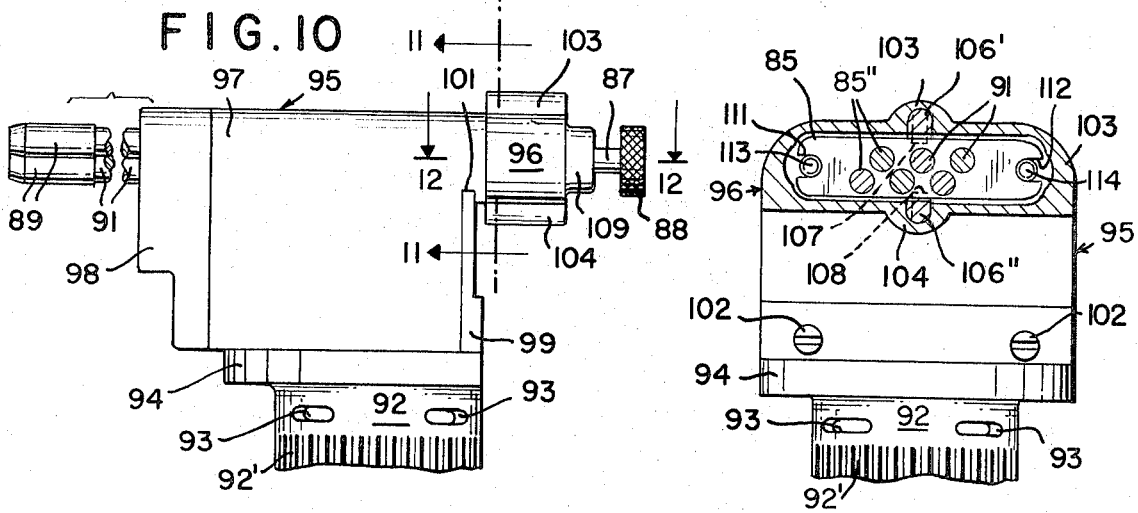
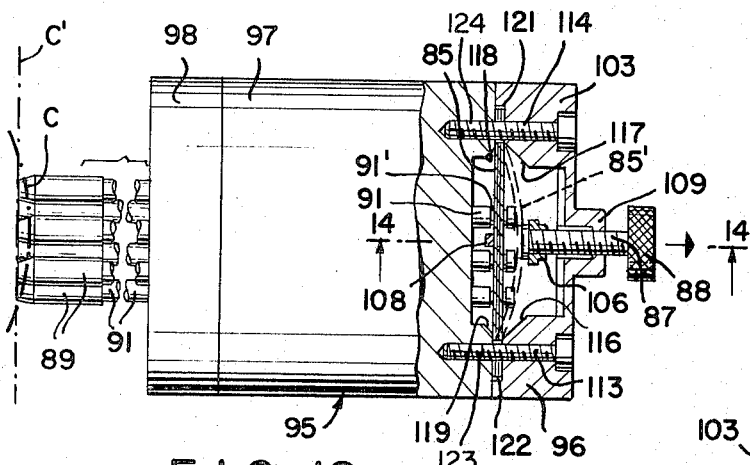
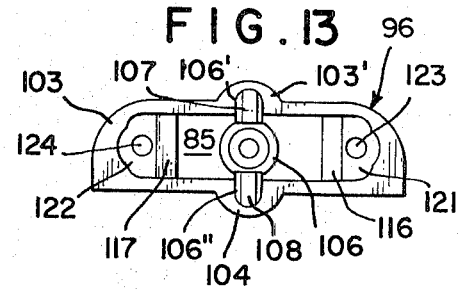
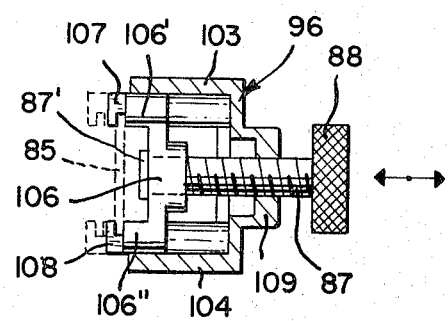

MOTOR-OPERATED MULTIPLE HAIR TRANSPLANT CUTTER TOOL

This invention relates to a motor operated hair transplant cutter tool.

It is an object of the present invention to provide a hair transplant cutter tool having a handle and a cutter tool head in which a multiple number of cutter tool elements and their shanks are assembled in nested and parallel relationship with one another for the purpose of cutting multiple patches from the scalp at one time.

It is another object of the invention to provide a multiple hair treatment cutter tool in which the cutter tool elements can be adjusted between two positions, extended or retracted or can be shaped so that the cutting edges can conform to the curvature of the scalp, so that equal cutting of the patches of skin can be effected, the adjustment of the tool to conform to a curvature including a bendable member to which the respective cutter tool element shanks are respectively rotatably connected and an adjusting member is provided on the top of the cutter tool head which is vertically adjusted to bend the bendable member to the desired curvature.

It is another object of the invention to provide a motor operated hair treatment cutting tool in which the electric motor is provided in the handle and the cutting tool head is extended from the handle so that the cutter tool elements depend from the head and wherein a foot switch is connected by a cable to the handle and adapted to be connected to a wall receptacle so that an electric current can be provided for the motor upon the operation of the foot switch.

Other objects of the invention are to provide a power operated hair treatment cutting tool, having the above objects in mind, which is of simple construction, has a minimum number of parts, inexpensive to manufacture, of pleasing appearance, easy to service and maintain, durable, effective, and efficient in use.

For a better understanding of the invention reference may be had to the following detailed description taken in connection with the accompanying drawing, in which:

FIG. 1 is a side elevational view of the multiple hair transplant cutting tool embodying the features of the present invention.

FIG. 2 is a top plan view of the cutting tool.

FIG. 3 is a transverse sectional view of the cutting tool as viewed on line 3—3 of FIG. 1.

FIG. 4 is a further transverse sectional view taken on line 4—4 of FIG. 4.

FIG. 5 is a fragmentary longitudinal sectional view taken on line 5—5 of FIG. 2 and looking upon the drive mechanism therefor.

FIG. 6 is an enlarged fragmentary longitudinal sectional view taken on the same line 5—5 of FIG.2 and looking upon one of the cutting tool shanks and the latch therefor.

FIG. 7 is a perspective view of a latch removed from the tool assembly.

FIG. 8 is a front elevational view of the removed latch.

FIG. 9 is a perspective view of the multiple hair transplant cutting tool with illustration made as to the manner in which the tool and its cutting elements are applied to the head surface, the cable and foot switch for receiving power from a receptacle source extending from the tool handle.

FIG. 10 is a fragmentary side elevation view of a modified form of the multiple hair transplant cutting tool in which the cutting elements can be adjusted to the contour of the head of the patient by a single adjusting screw.

FIG. 11 is a transverse sectional view of a modified form of the invention as viewed on line 11—11 of FIG. 10 and showing the several cutting element shanks.

FIG. 12 is a top plan view of the cutting tool with the top portion broken away as viewed on line 12—12 of FIG. 10 to show the multiple hand screw head surface curvature adjusting mechanism.

FIG. 13 is a plan view looking into the open bottom face of the top cover piece.

FIG. 14 is an enlarged sectional view in elevation taken of the adjusting screw mechanism and of the adjustable plate holder with illustration being made of full and dotted line positions of the adjusting screw plate holder, the view being taken generally on line 14—14 of FIG. 12.

FIG. 15 is a fragmentary sectional view of the plate retaining head for grasping the bendable shank retaining plate with the adjusting screw extending therefrom.

Referring now to the form of the invention shown in FIGS. 1 to 8, 20 represents a multiple hair transplant cutting tool that generally comprises a handle 21 containing an electric motor 22 as shown in phantom in FIG. 4 supplied with electric current from a cable 23 entering the handle 21 at one end thereof and an enlarged head 24 fixed to the opposite end of the handle 21 into which enters a drive shaft 26 of the motor 22 having a worm pinion 27 that drives a worm wheel 28 that in turn is connected with a train of small gears indicated generally at 29 as best seen in FIG. 3 to which is respectively connected cutting element drive shanks 31 that extend vertically through the head 24 outwardly through the bottom thereof as best seen in FIGS. 1, 5 and 8 and having slide fitted on their lower ends respective cutter tool elements 32. The upper ends of the cutter tool element drive shanks extend through the top of the head 24 and may be engaged from the side by hand latch members 33, one for each of the six cutting element drive shanks 31, and slidable longitudinally over the tool to grip the shanks 31 at different axially adjusted locations so that any one or a number of the cutter tool elements 32 and their shanks 31 can be retracted or extended for use in effecting a cutting of circular transplant skin patches from the scalp of one's head bearing hair or upon the skin of the bald area of the head for making openings into which the hair transplant patches taken from the head over the hair area may be applied to the holes through the skin made over the bald area of the head.

The handle 21 is a casting of lightweight metal and has on its exterior surface a mass of parallel ribs so that the surgeon may have a good hand grip upon the cutting tool 20 and being applied to the head in the fashion shown in FIG. 9. Extending laterally from the opposite sides of the hand grip are brush spring adjusting screws 34 and 36 extending respectively from the opposite sides of the handle 21 and serving to hold and adjust the spring for the brushes of the electric motor 22 in a manner well known for the servicing of such electric motors. The cable 23 runs into the lower end of the handle 21 through an end plate 37 which is rounded and which may have air ventilated openings extending longitudinally therethrough, not shown and a rearwardly extending projection 38 through which cable 23 centrally extends for connection with a foot switch 39 FIG. 9 that is preferably rested upon the floor and operated by a foot of the surgeon and from which a cable 41 with a plug 42 extends for connection to an electric receptacle source.

The upper end of the handle 21 has an enlarged flange 42' sheared from the top edge to lie flush with the upper surface of a closure plate 43 of the enlarged head 24. Below the flange 42' on the handle 21 are elongated air openings 44 and 44'. The rear face of the head 29 is flat and the flange 42' of the handle part 21 is flush fitted onto the rear face of the enlarged head 24 and retained by screws, not shown, extended through the flange into the flat face of the head 24.

The head 24 is hollow and generally of square transverse section and includes a main body part 46 open at the top and bottom ends thereof with the cover plate 43 partially enclosing the upper opening thereof with its rear edge lying flush against the end face of the flange 42' of the handle part 21 as best seen in FIG. 1 and with its forward edge extended into an undercut recess 47 in a raised upper extension 48 of little height but sufficiently to accommodate the cutting element shank latches or hand latch members 33 operable respectively in respective grooves 49 provided therein and running parallel to one another but with the three grooves 49 at the rear of the head piece 46 being laterally respectively offset from the three respective grooves 49 on the front of the head main body part 46 and in the extension 48 thereof.

Fitting flush against the extension 48 on the top of the body part 46 is a transversely extending box piece 51 through which the drive shanks 31 extend, there being six openings 52 therethrough to accommodate the respective six shanks 31. This box piece 51 holds the shank latch members 33 against outward displacement from the grooves 49 in the extension 48 on the head body part 46 FIG. 4. The six shanks openings 52 in the box piece 51 are aligned with a wide vertically extending opening 53 in the main body part 46 that accommodates all of the shanks 31 but from which guide openings 54 for the respective shanks 31 to guide the shanks 31 within the body part 46 are axially aligned with the openings 52.

The box piece 51 is held in place upon the body part 46 by laterally spaced socket head screws 56 while the closure plate 43 is held in place by socket head screws 57 and both parts are thus removable from the main head body 46 by removing the screws to thereby provide access to the hollow interior of the body part 46.

Within the body part 46 and intermediate the height thereof is an intermediate wall 58 which rotatably supports a hub sleeve 59 of the gear 28 that is fixed to a drive shaft 61 that extends downwardly and supports wheel gear 28' by its hub sleeve 62 and set screw 63. A reduced lower end 64 is journaled in a bottom cover plate 65 that encloses the full open lower end of the body part 46. The hub sleeve 59 of the worm wheel gear 28 is fixed to the shaft 61 by a set screw 61'. When the electric motor 22 is activated the worm gear 27 on the shaft 26 is driven to turn worm wheel, 28, the drive shaft 61 and the wheel gear 28'. The wheel gear 28' is as best seen in FIG. 3 in mesh with first adjacent small gear 29a fixed to a corresponding cutting tool shank 31a and in succession gears 29b, 29c, 29d, 29e, 29f are in mesh, of respective cutting element shanks so that with the gear wheel 28' being driven on one direction, the respective shanks will be driven alternately with the shanks 31a, 31c and 31e being rotated in one direction as indicated by the arrows in FIG. 3 while the shanks 31b, 31d, and 31f are driven in the opposite direction. These shanks 31a, 31c, and 31e lie in one row while the shanks 31b, 31d, and 31f lie in another row with the shanks of one row being respectively offset with the respective shanks of the other row as well as the shanks of one row being driven in one direction while the shanks of the other row are driven in the opposite direction so that the cutter tool elements 32 on the lower ends of the shanks 31 will by their tapered ends and circular cutting edges, sharpened for delicate cutting and being hollow, take out from the head scalp six small patches of skin so that the patches of skin taken from a hair area of the scalp can be located in the openings on the bald area of the scalp left by the removal of non-hair patches. The cutter tools 32 are hollow, cylindrical, sleeve shape adapted to be slide fitted in a somewhat friction tight manner upon the ends of the shanks 31 and have open end slots 32'' for receiving pin projections 31' projecting radially outwardly from the surfaces of these shanks to effect a driving connection between the shanks and the cutter tool element 32 whereby the cutting tool elements 32 will be driven in unison to effect a mutiple cutting operation. The detailed construction of such a cutting tool element or head is described and claimed in the U.S. Pat. No. 3,561,449 of Frank A. Bellantoni, now deceased.

The bottom plate 65 is held in place to enclose the lower end of the same 46 by socket head screws entering the lower end of the main body head piece 46. This bottom plate 65 has a recess 66, FIG. 5, through which the cutting tool shanks 31 extend and are guided by a replaceable perforated guide plate fitted in the bottom of the recess.

Holes 68 respectively project from the bottom of the recess 66 through the plate 65 through which the shanks 31 extend for free rotation therein, these openings 68 being oversized of the diameter of the shanks 31 whereas the guide openings in the plate 67 are in close fitting engagement with the shanks 31 but still permitting free rotation therein.

The shank gears 29 are of greater length than the length of their drive gear 24 to permit axial adjustment of the shanks 31 through the tool elements head assembly 24 so that one of the cutter tools 32 can be retracted to an out of use position relative to the others or several such cutter tools can be retracted leaving but one or two cutter tool element adapted for use so that with this same tool 20 one, two or several cutting operations can be effected at once depending upon the number of cutter tools that remain extended.

In order to hold the cutter tool element drive shanks 31 and their cutter tools 32 in their raised or extended positions while permitting rotation in either of these positions and yet be held against axial displacement during their rotation and against dropping from their retracted positions, the tool shanks 31 are held by their respective associated slide latch members 33 best seen in FIGS. 7 and 8 removed from the tool head. These latch members 33 have a plate portion 71 that extends at right angles from a handle portion 72 which may be gripped by the thumb and finger to slide the plate latching portion 71 radially toward the shank 31 or radially outwardly therefrom. The plate latch portion 71 has an open slot 73 in its free end that receives any one of a series of reduced diameter portions 74 or grooves axially spaced from one another along the drive shank. When of the latch member 33 is slid home over a reduced diameter portion 74 of the shank and into the groove provided thereby, the shoulder face 75 on the plate latch portion 71 surrounding the slot 73 will serve to stop downward displacement of the shank 31 by engagement with an end face of one of the larger diameter portions 76 lying between the reduced diameter portions 74 so that the shaft 31 will be held against downward displacement. A front face 77 on the plate portion 71 will bear against the opposite face of the groove or upon the large intermediate portion 76 to hold the shanks 31 against upward displacement. The shanks 31 are thus free to turn within the slot 73 on the end of the latch plate portion 71 but are held against axial displacement either against downward or upward displacement and yet permitting rotation of the shanks 31.

In order to hold the shank latch members 33 against outward removal from the tool head 24 upwardly extending spaced stop portions 78 and 79 respectively lying at opposite sides of the slot will engage stop surfaces on the walls of the opening 53 as shown in FIG. 4 which oppose one another with the wall at one side serving to stop one row of three latch members 33 and the other wall at the opposite side serving to stop the opposite row of offset latch members 33. The latch members 33 can by its handle 72 either by pushed inwardly as illustrated in both FIGS. 5 and 6 or outwardly to make the connection with the shank. When the latch members are pulled outwardly the shank 31 can be axially adjusted freely to another reduced diameter or groove portion 74 depending upon the amount of retraction or extension desired for the particular cutter tool 32. The upper end of the shank is notched or provided with a groove 81 which will receive a plate edge to effect rotation of the shank 31 and its gear 29 to work the shank 31 sufficiently loose so that free turning of the gear train 29 can be started or the shank 31 axially adjusted thereby.

It should thus now be apparent that with the form of the invention just now described that individual axial adjustment of the cutting heads to retracted or extended positions can be effected and that these shanks or shafts are held in their positions by the hand manipulable latch members 33.

The second form of the invention wherein all shanks are axially adjusted at the same time to conform the cutting edges of the cutter tools to the curvature of the head will now be described, the rotation and operation of the shanks in their driving relationship being the same as with that just described.

Referring now particularly to the FIGS. 10 to 16, there is shown a further form of the invention in which a head curvature is taken into consideration and the hair transplant cutter tool is so constructed to adjust the cutter tool elements to the desired curvature as best illustrated in FIG. 12. When the cutting tool elements are being used on the curved portion of the head, the cutting edge of the cutter tools are retracted to conform to the curved line C in FIG. 12 and a bendable plate 85 will assume a dotted line position 85' having been adjusted to such position by an adjusting screw 86 having an integral hand knob 88. When the cutter tools 89 and their shanks 91 are adjusted to have the cutting edges of these cutter tools 89 lie in a vertical plane indicated at C' and flush with one another, the cutter tool is adapted for operation on a more or less flat portion of the scalp where there may be very little curvature if any. The bendable plate to which shanks 91 of the several cutter tool elements 89 are connected will then be located in its full line position shown in FIG. 12. As best seen in FIGS. 12 and 15, the upper ends of the shanks 91 are grooved at 91' and are forced through undersize openings 85'' in the bendable plate 85 and when in place are held by the shoulders of the groove 91' against axial displacement therefrom. This transplant cutter tool is generally constructed in the same manner as the tool 20 of the first form of the invention and has a hand grip part 92 that is ribbed at 92' to give the surgeon a good grip on the tool when making use of the same in the manner shown in FIG. 9. This handle part 92 has a motor similar to the motor 22 shown in FIG. 4 with a drive shaft that will effect the driving and rotation of several gears provided therein and not shown in FIGS. 10 to 15 so that rotation of the several cutter tools 18 is effected in the same manner as above described with the first form of the invention with the shanks 91 of the cutter tool elements being freely rotatable in the openings 85' of the bendable plate 85. This handle part 92 has ventilating openings 93 to remove heat generated by the internal motor and a flange 94 serving for the attachment of cutter tool head assembly 95 thereto by attaching screws, not shown. This cutter tool head assembly 95 is generally of the same construction as the head assembly 24 of the first form of the invention except for a top box piece 96 which is of different shape than the top box piece 51. A main body part 97 is hollow and has a bottom cover plate 98 outwardly through which the cutter tool shanks 91 extend and likewise fastened to body piece 97 by screws, not shown. A slide fit cover plate 99 encloses the top opening of the body piece 97 by its forward edge slid into a groove or slot 101 and retained in place by laterally spaced screws 102, FIG. 11. In this manner it will be seen that the tool head assembly 95 is fully enclosed, and that it contains drive mechanism such as shown in the first form of the invention.

Top box piece 96 has opposing front and rear outwardly curved hollow bosses 103 and 104 that serve to guide inward and outer movement of a headgrip member 106 that has opposing claw or hook projections 107 and 108 that grips the bendable plate 85 along its respective opposite long forward and rear side edges as best seen in FIGS. 14 and 15. The head grip member 106 has rounded and enlarged diametrically opposite portions 106' and 106'' that conform in section to the interior of the respective hollow bosses 103 and 104 of the box piece 96 so that axial movement of the grip head 106 is guided when the movement is effected by adjustable screw 87 and the turning of its knob 88. This adjustable screw 87 extends outwardly through an upwardly extended boss 109 with which the screw 87 has threaded engagement. As the adjustable screw 87 is turned outwardly the claw head 106 to which the adjusting screw is connected by engagement of its end shoulder 87' with the interior of the head 106, the bendable plate 85 will be bowed rearwardly to its dotted line position 85' shown in FIG. 12 and the cutter tool elements 89 will along their edges assume line curvature C as shown in FIG. 12. If the adjustable screw 87 is turned in the box piece 96 so that it is adjusted inwardly then the bendable plate 85 will assume its flat condition as shown in full in FIG. 12 and the cutting edges of the cutter tool elements 89 will lie in a vertical plane along line C'.

The bendable plate 85 is elongated and has rounded ends in which there are respectively located opened end slots 111 and 112 through which socket headed fastening screws 113 and 114 respectively extend in the securing of top box piece 96 to the top of the main body piece 97.

The openings in the interior of the box piece 103 is relieved adjacent the opposite ends thereof as indicated at 116 and 117 to provide inclined faces to accommodate the ends of the bendable plate 85 as it is curved into the dotted line position 85'. Similar and opposing reliefs can be provided for movement of the bendable plate 85 to a downwardly curved position, not shown and in the upper face of the main body piece 97 as indicated at 118 and 119.

In order to accommodate and at the same time retain the ends of the bendable plate 85 against axial displacement, the opposite sides of the inner face of the box piece 96 are recessed as indicated at 121 and 122 to provide a workable space for the ends of the bendable member to be worked in and out as the bendable member is straightened or curved. Screw holes 123 and 124 are respectively provided in the box piece 96 to accommodate the respective fastening screws 113 and 114 that are threaded into the upper face of the body piece 97.

It should now be apparent that there has been provided a motor driven transplant cutter tool adapted for the cutting of multiple hair patches from the hair area of one's scalp and multiple patches from the bald area which are removed to provide openings for the replacement with the cut hair patches. This hair transplanting tool has multiple cutter tool elements and shanks extendable vertically through the tool head and appropriate mechanisms are provided in the tool head and driven by the electric motor in a handle part extending laterally from the tool head so that the cutter tool shanks and elements will be rotated in unison. In both forms of the invention the cutter tool shanks are axially adjustable through the cutter tool head and according to one form the individual cutter tool elements and shanks can be adjusted between several retracted and operating positions individually and one at a time while according to the second form of the invention adjustable mechanism is provided for effecting simultaneous adjustment of all of the cutter tool elements to align their cutting edges for use upon the head and to adapt the tools to the curvature of the head where in some areas these curvatures are more or less curved and a cutting edge of the cutter tool should conform to this curved area of the head for the equal depth cutting of the scalp.

While various changes may be made in the detailed construction of this transplant cutter tool, it should be understood that such changes shall be within the spirit and scope of the present invention as defined by the appended claims.

What is claimed is:

1. A motor-operated multiple hair transplant patch cutter tool comprising a handle part and a cutter tool head part having a top and a bottom, and the head part being carried upon the handle part, a plurality of cutter tool element drive shanks extending in a parallel relationship with one another and fully through and from the top and bottom of the cutter tool head part, said cutter tool element drive shanks each having its longitudinal axis extending about vertically to the top and bottom of the cutter tool head part, means for securing each shank alternately in each of extended and retracted positions and axially adjustable in the cutter tool head part between the extended and retracted positions, hair patch tissue circular cutter tool elements being carried respectively upon the respective journaled cutter tool element drive shanks, a gear train including drive gears meshed in succession with one another and respectively carried by the respective cutter tool element drive shanks, an electric motor carried in one of the parts and having pinion and drive gear means connected with one of the drive gears of the cutter tool element drive shafts, whereby all of the cutter tool elements may be driven in unison upon operation of the electric motor, each of said cutter tool elements being in the form of a sleeve with a circular cutting edge adapted to cut a patch of hair tissue from the scalp and means on the head part operable for connection to the drive shanks to secure them in either their extended or retracted positions whereby one or more patches of hair may be taken from a hair area of the scalp for the purpose of being transplanted into openings that may have been provided by the cutter tool element in a bald area of a person's head, said means for securing the cutter tool element shanks including curvature-adjusting mechanism for adjusting the cutting tool elements in unison so that the cutting edges of the cutter tool elements can be aligned with one another to provide more or less contour curvature for adapting the cutting edges of the cutting tool elements to the curved rounded portions of the head part, said curvature adjusting mechanism including a bendable plate slidably secured at ends thereof to the cutting tool head part and rotatably receiving the respective cutter tool element shanks and an adjustable member connected to the bendable plate intermediate its length and carried on the cutting tool head to bow the bendable plate from a flat transversely extendable shape, said cutter tool head part including a transversely extending box member, said bendable plate underlying the box member and said cutter tool head part having a main body, said bendable plate having open slots on the ends thereof, said transverse box member being recessed to receive the slotted ends of the bendable plate to permit the working of its ends within the box member while the bendable plate is being bowed or returned to its straightened condition, fastening screws for securing the box member to the body member extendable through the recesses of the box member and through the slots of the bendable plate to secure the box member in place upon the body member.

2. A motor-operated multiple hair transplant cutter tool as defined in claim 1, said electric motor being provided in the handle part, having said pinion and drive gear means comprising a motor drive shaft and pinion extending from the motor into the cutter tool head part, for the connection of the motor with the train of gears on the cutting tool element shanks and including a worm pinion on the motor drive shaft, a shaft extending vertically relative to the top and the bottom of the head part and the vertically-extending shaft being journaled in the head part in parallel to the shanks, a worm wheel on said vertically-extending shaft connecting said shaft with the motor worm pinion and a gear wheel driven by said vertically-extending shaft engaging with the gear of the one of the drive gears of the one of the train of cutter tool element shanks.

3. A motor-operated multiple hair transplant cutter tool as defined in claim 1, said means to secure the drive shanks in their extended and retracted positions including the provision on each of the cutter tool element shanks at least two stop shoulders spaced in a direction vertical to the top and the bottom of the head part, and latch members slidable in the tool head in the cutter tool head part positioned transversely for engagement with or release from the respective cutter tool shank shoulders.

4. A motor-operated multiple hair transplant cutter tool as defined in clim 3, said shoulders being provided by reduced-diameter portions spaced in a direction vertical to the top and the bottom of the head part and providing grooves in the shanks, each of said latch members having a horizontal portion relative to the top and the bottom of the head part and another portion extending upwardly vertically from the horizontal portion, said horizontal portion having an open end slot on its inner end adapted to be extended into the groove afforded by the reduced diameter portions of the cutter tool element shank and upwardly extending stop projections on the horizontal portion of the latch members each serving for engagement with stop surfaces within the cutter tool head to prevent the disengagement of the latch member when moved to its out of engagement position with the shank so as to allow the axial adjustment of the cutter tool elements shank in the cutter tool head, said cutter tool elements shank in the cutter tool head, said cutter tool element shanks thereby being adjustable when free of the latch member being extended and retracted positions relative to the other cutter tool element shanks.

5. A motor-operated multiple hair transplant cutter tool as defined in claim 4, said cutter tool head part comprising a hollow main body piece open at its top end, transversely extending box piece open on its inner face, the top end face of the main body piece having an elongated raised projection having front and rear ends with a series of guide slots extending across the front thereof and a further series of guide slots extending across the rear thereof, said horizontal portions of the latch members for the cutting tool element shanks being slidable in said slots with the upwardly vertical portions extending from the front end to the rear end of the raised projection of the body part, said box piece extending over the latch member guide slots and secured to the top of the raised projection extending over the body part to retain the latch members in place thereupon and against outward displacement therefrom, said cutter tool element shanks extending upwardly through and in a direction outwardly relative to the top of the head part and to the transverse box piece respectively, said raised projection on the main body part being notched at its rear end and a partial cover piece having its front end extending into the notch and secured to the main body part to further close the top opening thereof.

6. A motor-operated multiple hair transplant cutter tool as defined in claim 1, said bottom and said top each having a face extending between forward and rearward upright sides, said cutter tool element shanks being arranged in at least two groups of substantially parallel shanks grouped at least three per group, one group lying toward the forward side in the cutting head and the other group lying toward the rearward side with the cutting tool element shanks respectively laterally offset from one-another with the respective corresponding cutter tool element shanks of the one group being rotated in opposite direction from the cutting tool element shanks of the other group.

7. A motor operated multiple hair transplant cutter tool as defined in claim 1 and said curvature adjusting mechanism including an adjusting screw threadably contained in said box member and extending outwardly therefrom having a turning knob thereon, and a head member carried on the adjusting screw and grasping opposite forward and rearward edges of the bendable plate to work the bendable member between straight and curved shapes.

8. A motor-operated multiple hair transplant cutter tool as defined in claim 7, said box-like member having opposing hollow bosses at faces thereof positioned toward said forward and rearward sides respectively and providing internal opposing guide slots and said adjustable head having forward and rearward portions operable in the opposing guide slots.

9. A motor operated multiple hair transplant cutter tool as defined in claim 1 and said cutter tool element shanks being arranged in forward and rearward rows of three shanks each, the shanks of one row being respectively offset with the shanks of the other row and said cutter tool element shanks being grooved and rotatably contained by their grooved portions in the bendable plate.

* * * * *